United States Patent [19]

Talenti

[11] 4,101,039

[45] Jul. 18, 1978

[54] APPARATUS FOR COLLECTING AND COMPACTING WASTE MATERIAL

[75] Inventor: Pier F. Talenti, Washington, D.C.

[73] Assignee: Orbital Collection Systems, Inc., Washington, D.C.

[21] Appl. No.: 762,601

[22] Filed: Jan. 25, 1977

[51] Int. Cl.$^{2}$ .................... B60P 1/42

[52] U.S. Cl. .................... 214/83.32; 100/185

[58] Field of Search .................... 214/507, 82, 83.3, 83.32; 100/185, 186, 244, 217

[56] References Cited

U.S. PATENT DOCUMENTS

| | | | |
|---|---|---|---|
| 327,435 | 9/1885 | Curry | 100/244 |
| 2,421,465 | 6/1949 | Schley | 100/295 |
| 3,990,590 | 11/1976 | Zompetta | 214/507 |

*Primary Examiner*—Albert J. Makay

*Attorney, Agent, or Firm*—John J. Byrne

[57] ABSTRACT

A method and apparatus for collecting and compacting waste material.

The apparatus includes a hollow cylindrical container operable to be rotatably mounted upon the chassis of a motor vehicle. The container is provided with waste material charging means at each end thereof and is interiorly fitted with a rotatable discoid element adjacent each charging means for directing waste material deposited within each end of the container toward the center thereof. The container may be further constructed with two sets of opposite hand helical translating vanes such that material deposited within either end of said container will be translated toward and tightly compacted generally in a central portion of the container upon rotation of the container. Each end of the container may be further provided with resiliently mounted breaker means to reduce the size of waste objects as the objects are fed into the container.

The method includes the steps of depositing waste material within a container at either end thereof, translating the waste material from either end toward the center of the container and compacting the waste material deposited from one end against waste material deposited from the other end to minimize interstitial voids within a fully loaded container. The method may further include the step of resiliently reducing large objects during ingress of the objects into the container.

6 Claims, 4 Drawing Figures

APPARATUS FOR COLLECTING AND COMPACTING WASTE MATERIAL

BACKGROUND OF THE INVENTION

This invention relates to a method and apparatus for collecting and compacting waste material. More particularly, this invention relates a method and apparatus for collecting and compacting waste material such as household garbage, trash or the like within a container operable to be carried by a motorized vehicle.

In the past the task of residential trash collection has been typically performed by a team of two or three men utilizing a rear loading container mounted upon a truck chassis.

One type of previously known trash container may be generally described as being rectangular in cross section and fixedly mounted upon a truck chassis. A charging or loading trough is fashioned at the rear of the container to receive loose trash or pliable containers such as trash bags and the like. A hydraulically actuated gate is then designed to engulf the waste material deposited within the loading trough and scoop or push the material into the container for compaction against the front end wall thereof.

Another type of previously known apparatus entails a trash container which is circular in cross section and rotatably mounted upon a truck chassis. Of the rotatably mounted containers, one design which exhibits considerable appeal is disclosed in a U.S. Pat. No. 3,559,795 of common assignment with the subject application. In this patent a charging opening at the rear end of the container is disclosed with a shell-shaped baffle disposed inwardly of the opening. Refuse or solid waste material is introduced through the opening and falls downwardly into a space defined by the shell-shaped member and the container end wall. A series of ribs or flanges are mounted upon the interior of the container wall and upon rotation of the container serve to lift refuse introduced into said opening up and around the shell-shaped member. The refuse then falls downwardly onto the shell-shaped member, which, due to its configuration, deflects and directs the materials toward the closed end of the container. Although such a rotatable container exhibits many advantages one disadvantage is that the shell-shaped member is subject to frictional wear as waste is loaded into the container.

A significant step in prolonging the operating life of rotatable waste material containers is disclosed in U.S. application Ser. No. 432,226 also of common assignment with the subject application. In this structure the shell-shaped member is replaced with a freely rotatable discoid element. As waste material is lifted over the end wall and into the container it falls downwardly onto the discoid element which imparts a rotational movement thereto. Such rotational movement minimizes frictional contact between the solid waste materials and the end wall. In addition to the discoid element this application discloses a helical vane or screw affixed along the interior surface of the container. Upon rotation of the container waste material therein tends to be translated toward the forward, closed end thereof.

Although waste material containers, such as previously described, are highly useful and exhibit marked advancements in the state of the art, room for further improvement remains. More specifically it would be highly desirable to provide a method and apparatus for collecting and compacting waste material which will reduce the number of cycles to a central dumping area and thus increase the efficiency and decrease the cost of a collection operation. In a similar vein, it would be desirable to provide a method and apparatus for collecting and compacting waste material which will retain the advantages of the previously described devices while reducing interstitial voids within the waste material as the container is packed out.

It would also be desirable to provide a method and apparatus for collecting and compacting waste material which would facilitate loading and use by operators. Further, it would be desirable to provide a method and apparatus for collecting and compacting waste material operable to reduce large items as said items are deposited within said collecting apparatus.

OBJECTS OF THE INVENTION

It is therefore a general object of the invention to provide a method and apparatus for collecting and compacting waste material which reduces the number of cycles to a central dumping area, increases the efficiency and decreases the cost of a waste collection operation.

It is a particular object of the invention to provide a method and apparatus for collecting and compacting waste material which will minimize interstitial voids within the waste material as the container is packed out.

It is a further object of the invention to provide a method and apparatus for collecting and compacting waste material which will facilitate loading and use by operators.

It is another object of the invention to provide a method and apparatus for collecting and compacting waste material which will reduce the size of large items of waste material as the material is fed into the container.

It is yet another object of the invention to provide a method and apparatus for collecting and compacting waste material wherein large items of waste material will be reduced as the material is fed into the container while minimizing the possibility that the oversized items will become jammed within the charging and reducing apparatus.

THE DRAWINGS

Other objects and advantages of the present invention will become apparent from the following detailed description of a perferred embodiment taken in conjunction with the accompanying drawings wherein:

FIG. 1 is an axonometric view of an apparatus for collecting and compacting waste material rotatably mounted upon the chassis of a motor vehicle;

FIG. 2, note sheet 2, is a cross-sectional view taken along section line 2—2 in FIG. 1 which discloses various internal features of the apparatus for collecting and compacting waste material;

FIG. 3, note sheet 1, is a cross-sectional view taken along section line 3—3 in FIG. 2 and discloses a rotatably mounted discoid element and a resiliently mounted breaker bar to reduce waste material upon ingress into the container; and FIG. 4, note sheet 2, is a cross-section view taken along section line 4—4 and discloses a plan view of the resiliently mounted breaker bar depicted in FIG. 3.

DETAILED DESCRIPTION

Figure 1:
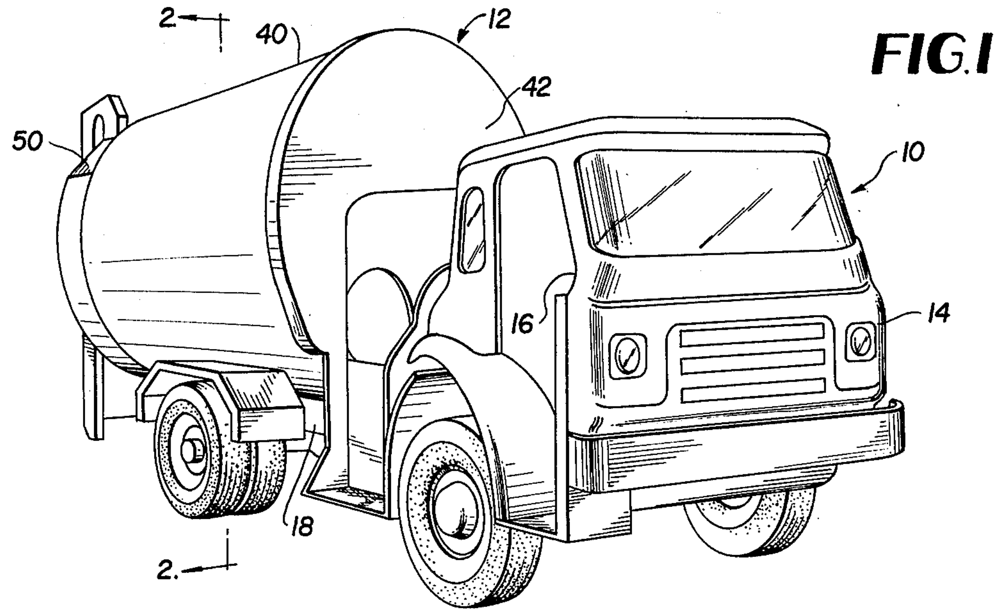

Referring now to the drawings and particularly FIG. 1, there will be seen an axonometric view of a motor vehicle 10 operably carrying a collection and compacting apparatus 12 in accordance with a preferred embodiment of the invention.

The motor vehicle 10 is generally of a conventional design but includes a cab 12 with a permanently open right hand door frame 16 such that an operator or an operator's assistant may facilely alight to pick up trash etc. along a curb. The vehicle 10 further includes a chassis 18 comprising a pair of channel beams 20 and 22, note FIG. 3 which extended rearwardly from the cab and longitudinally beneath the apparatus for collecting and compacting waste material 12.

Figure 2:
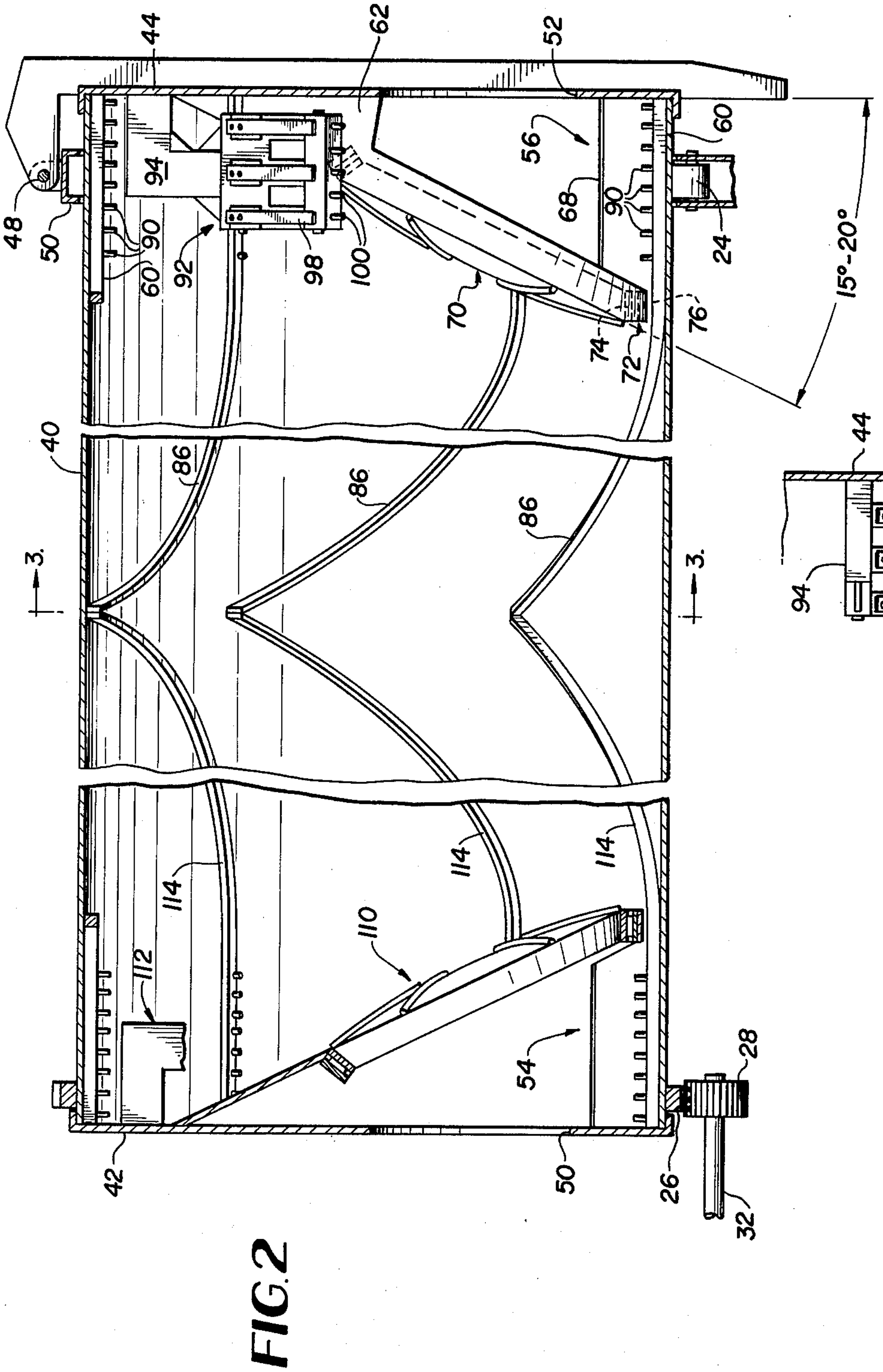
Figure 4:
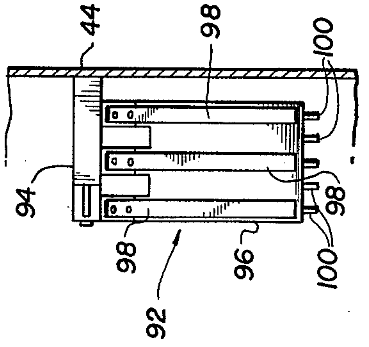

Apparatus 12 is mounted upon chassis 18 for rotation about the central longitudinal axis thereof through the provision of at least a pair of cradle rollers 24 and 26 which in turn are journaled on the channels 20 and 22 respectively. In this connection, although FIG. 2 merely depicts one set of cradle roller pairs other roller sets may be carried by the chassis in longitudinally spaced relation throughout the length of the container.

Selective rotation for the apparatus 12 may be achieved with a perimeter applied rim gear 28 and pinion 30 combination which may be hydraulically or electrically driven via drive shaft 32. Alternatively, rotational motion may be imparted to the apparatus 12 through the provision of a chain and sprocket arrangement as is well known in the art.

The foregoing motor vehicle structure, as previously mentioned, is intended to be a generally conventional design of the type which may be procurred from motor vehicle companies. Once the motor vehicle is purchased it may then be fitted with a waste material collection and compacting apparatus 12 in accordance with the subject invention.

The subject invention entails a generally hollow cylindrical container body 40 having an end wall 42 and 44 positioned across the forward and rear end thereof respectively. The end walls are each mounted upon the motor vehicle chassis 18 and remain stationary while the container body 40 is mounted for rotational movement upon the chassis 18 as previously described. Moreover the rearward end wall 44 is pivotally mounted as at 48 to a chassis carried yoke 50. This pivotal mounting arrangement permits the end wall 44 to be swung upwardly and open to disgorge compacted trash from within the container at a central dump or land fill area.

Unlike previously known compacting and collecting cylinders the subject apparatus 12 is fitted at each end with a charging means including aperatures 50 and 52 and waste material receiving zones 54 and 56 fashioned within the forward end wall 42 and rearward end wall 44 respectively.

Figure 3:
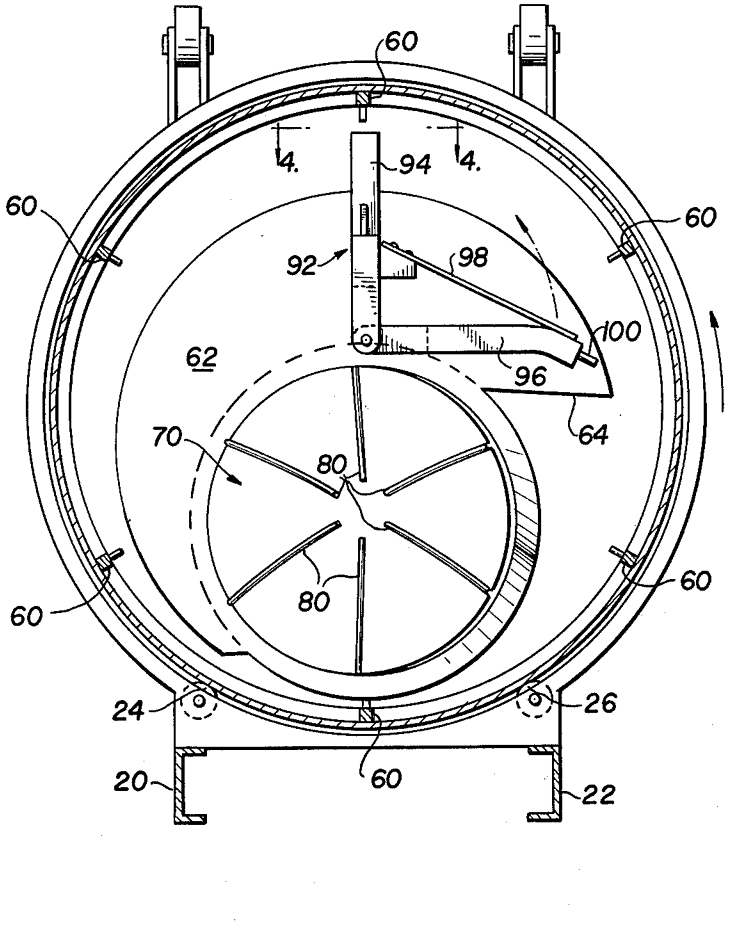

At the rearward end wall 44 the cylinder 40 is provided with a plurality of longitudinally extending peripherally spaced packing vanes 60 note FIG. 3. Packing vanes 60 serve to engage waste material deposited within the receiving zone 56 and lift the waste material into the interior of the cylinder 40 upon rotation thereof.

The rearward end wall 44 carries a cantilevered member 62 which semiconically projects inwardly therefrom in a posture longitudinally displaced from but blocking the opening 52. The member 62 is fashioned with a recess 64 within the right side thereof, as viewed in FIG. 3, which forms in cooperation with the end wall 44 and packing vanes 60 an opening to receive waste material deposited within receiving zone 56. In this connection as the cylinder 40 is rotated in a counterclockwise direction, as viewed in FIG. 3, waste material will be lifted upwardly by packing vanes 60 passed recess 64 and into the container 40.

The left hand side of the member 62 is closed and terminates with an edge surface 68 toward the bottom of the container. The semiconical wall of member 62 on the left side thereof prevents waste material lifted into the container from falling back into the receiving zone 56.

The waste material after being lifted into the container generally falls onto a rotatably mounted, arcuate discoid element 70. The discoid element 70 is circular and mounted upon the member 62 through the provision of a thrust bearing 72. More specifically, an inner race 74 is mounted around the discoid element and an outer race 76 is mounted upon the cantilevered member 62. A series of peripherally spaced rollers 78 are intercalated between the races and serve to reduce frictional contact between the inner and outer races as the discoid element 70 rotates with respect to the cantilevered member 62. The discoid element 70 may be fitted with a plurality of generally radially extending vanes 80 which serve to contact waste material falling thereupon.

The discoid element may be freely rotating or externally rotated by a hydraulic or electric drive. The primary function of the discoid element is to contact and direct waste material falling within the container toward the center thereof without encountering frictional scouring and damage in the process. The element 70 is preferably pitched on an angle of from 15° to 20° with a central axis pointing toward the upper opposing end of the container. It has been found that such a discoid element will serve to tightly compact waste material within the container toward the opposing end of the container.

To assist in the compacting function of the subject invention the interior wall is further fitted with translating vanes 86 which may be extensions of the previously described packing vanes 60. The translating vanes are applied to the interior wall of the container with a left handed helical twist taken from a line of sight toward the center of the container from the rearward end wall. Accordingly, as the cylinder 40 rotates clockwise about the longitudinal axis thereof, material within the container will tend to be crushed or carried from the rearward end wall 44 toward the center of the container to tightly pack the waste material within the container and reduce interstitial voids therein.

In a perferred embodiment of the subject invention the packing vanes 60 each carry a plurality of radially extending longitudinally spaced projections or teeth 90. The teeth 90 serve to firmly engage refuse deposited within zone 56 and carry the refuse into the container as previously detailed.

Further a preferred embodiment of the invention may include a breaker assembly 92 resiliently mounted upon the end wall 44. The breaker assembly 92 is cantilevered from the end wall in a posture substantially above the discoid element, note FIG. 3. The breaker assembly 92 includes a bracket 94 which carries a pivotally mounted breaker arm 96. The breaker arm 96 extends toward but is spaced from packing vanes 60, note FIG. 3, and is resiliently maintained in position by spring steel straps 98.

The outward extremity of the breaker arm 96 is fitted with generally radially extending projections or teeth 100 which function in mutually opposing cooperation with packing vane teeth 90 to reduce the size of large waste items as the items are lifted into the container 40. More specifically oversized items are lifted upwardly upon counterclockwise rotation of the cylinder 40 as viewed in FIG. 3. As the oversized object impacts the breaker arm 96 it will contact teeth 100 which will tend to reduce or shred the object as the container rotates. In the event the oversized object is particularly tough or resistant to size reduction the resilient straps 98 will flex and breaker arm 96 will pivot upwardly kicking the oversized object back down into the receiving zone 56. The process is repeated as the container 40 continues to rotate until the object is reduced in size so as to pass by the breaker arm 96 without engagement.

At the forward end of the container 40 the end wall 42 is provided with a discoid element 110 and breaker assembly 112 which are identical with their counterparts at the rearward end of the container. Accordingly these elements will not be described in detail except by reference to the previously noted counterpart elements. The mounting of the forward end elements, however, are mirror images of the rearward counterpart elements. In this regard the cylindrical container 40 is preferably fabricated with a continuous shell from one end to the other. Thus clockwise rotation of the cylinder when viewed from the rearward end is counterclockwise rotation of the cylinder when viewed from the forward end.

In the above vein helical translating vanes 114 extending from the forward end of the container are opposite handed when compaired with vanes 90 mounted at the rearward end of the container 40. Preferably the translating vanes 90 and 114 meet in approximately the center of the container and function in conjunction with the discoid elements 70 and 110 to tightly compact waste material within the container from both ends thereof.

The method aspects of the subject invention have been expressly or implicitly set forth in the foregoing but in brief sum include the steps of depositing waste material within either receiving zone 54 at the forward end of container 40 or receiving zone 56 at the rearward end thereof. The waste material is then lifted into the container at each end and directed and translated toward the center of the container through the provision of discoid elements 70 and 110 and translating vanes 90 and 114. The waste material is thus tightly packed against other waste material to minimize interstitial voids within a fully loaded container.

In the event large or oversized waste objects are deposited within receiving zones 54 and 56 they will be resiliently resisted by the breaking assemblies 92 and 112 in a manner as described more fully hereinabove.

In describing a method and apparatus for collecting and compacting waste material in accordance with a perferred embodiment of the invention those skilled in the art will recognize several advantages which singularly distinguish the subject invention from previously known devices.

A particular advantage is the realization of a method and apparatus for waste material collection and compaction which will provide a tighter more fully packed out container. This will reduce the number of cycles to a common dumping area, increase the efficiency of crews and decrease the cost of operating a waste collection enterprise.

Additionally the frictionless wear saving characteristics of the instant assignees prior inventions have been maintained while increasing container pay loads.

Still further the option of both front and rear end loading facilitates operator use and loading.

Additionally the resiliently mounted breaker bar aspect of the invention permits reduction of oversized items without jamming or fouling the normal loading and charging operation.

In describing the invention, reference has been made to a preferred embodiment. Those skilled in the art, however, and familiar with the disclosure of the subject invention, may recognize additions, deletions, substitutions, modifications and/or other changes which will fall within the purview of the invention as defined in the following claims.

What is claimed is:

1. An apparatus for collecting and compacting waste material comprising:

a hollow cylindrical container operable to be mounted upon a truck chassis for selective rotation about the longitudinal axis of said cylindrical container;

first end wall means operable to be mounted upon the truck chassis and being positioned across one end of said cylindrical container;

second end wall means operable to be mounted upon the truck chassis and being positioned across the other end of said cylindrical container;

means mounted upon said truck chassis and connected to said cylindrical container for selectively rotating said cylindrical container about the central longitudinal axis thereof;

charging means fashioned within each of said first and second end wall means for receiving waste material deposited at either end of said cylindrical container;

packing vane means mounted upon the peripheral interior surface of each end of said cylindrical container for raising waste material deposited within said charging means into said cylindrical container upon rotation of said container about the longitudinal axis thereof;

means connected to said cylindrical container for translating waste material deposited within each end of said cylindrical container toward the longitudinal center of said container, said means for translating including a first plurality of translating vanes mounted upon the interior surface of said cylindrical container and extending helically from one end of said container toward the center thereof;

a second plurality of translating vanes mounted upon the interior surface of said cylindrical container and extending helically from the other end of said container toward the center thereof;

first discoid means rotatively mounted upon one end wall of said cylindrical container and being directed generally inwardly and upwardly toward the central portion of said container, said first discoid means having generally radially extending vanes thereon and being mounted adjacent the charging means of said one end wall for contacting waste material delivered into the interior of said container and for directing said waste material toward the central portion of said container;

second discoid means rotatively upon the other end wall of said cylindrical container and being directed generally inwardly and upwardly toward the central portion of said container;

said second discoid means having generally radially extending vanes thereon and being mounted adjacent the charging means of said othe end wall for contacting waste material delivered into the interior of said container and for directing said waste material toward the central portion of said container;

wherein waste material deposited within said charging means at either end of said cylindrical container will be directed generally toward the center of said container by said first and second discoid element to tightly compact waste material within said cylindrical container; and first spring biased breaker means connected to said first end wall means and extending generally radially toward but spaced from the interior periphery of said one of said cylindrical container, said first spring biased breaker means being operable to act in opposing cooperation with said packing vanes mounted upon the peripheral interior surface of said one end of said cylindrical container wherein oversized waste material deposited within said first end charging means will be first raised by said packing vane means and if said waste material is larger than the passage between the radial extent of said spring biased breaker means and said packing vane means said waste material will contact the extremity of said spring biased breaker means and be reduced by said breaker means before entering said container; and second spring biased breaker means connected to said second end wall means and extending generally radially toward but spaced from the interior periphery of said other end of said cylindrical container, said second spring biased breaker means being operable to act in opposing cooperation with said packing vanes mounted upon the peripheral interior surface of said other end of said cylindrical container wherein oversized waste material deposited within said second end charging means will be first raised by said packing vane means and if said waste material is larger than the passage between the radial extent of said spring biased breaker means and said packing vane means said waste material will contact the extremity of said spring biased breaker means and be reduced by said breaker means before entering said container.

2. An apparatus for collecting and compacting waste material comprising:

a hollow cylindrical container operable to be mounted upon a truck chassis for selective rotation about the longitudinal axis of said cylindrical container;

first end wall means operable to be mounted upon the truck chassis and being positioned across one end of said cylindrical container;

second end wall means operable to be mounted upon the truck chassis and being positioned across the other end of said cylindrical container;

means mounted upon said truck chassis and connected to said cylindrical container for selectively rotating said cylindrical container about the central longitudinal axis thereof;

charging means fashioned within each of said first and second end wall means for receiving waste material deposited at either end of said cylindrical container;

packing vane means mounted upon the peripheral interior surface of each end of said cylindrical container for raising waste material deposited within said charging means into said cylindrical container upon rotation of said container about the longitudinal axis thereof;

means connected to said cylindrical container for translating waste material deposited within each end of said cylindrical container toward the longitudinal center of said container, said means for translating including first discoid means rotatively mounted upon one end wall of said cylindrical container and being directed generally inwardly and upwardly toward the central portion of said container, said first discoid means having generally radially extending vanes thereon and being mounted adjacent the charging means of said one end wall for contacting waste material delivered into the interior of said container and for directing said waste material toward the central portion of said container, second discoid means rotatively mounted upon the other end wall of said cylindrical container and being directed generally inwardly and upwardly toward the central portion of said container, said second discoid means having generally radially extending vanes thereon and being mounted adjacent the charging means of said other end wall for contacting waste material delivered into the interior of said container and for directing said waste material toward the central portion of said container;

wherein waste material deposited within said charging means at either end of said cylindrical container will be directed generally toward the center of said container by said first and second discoid element to tightly compact waste material within said cylindrical container; and first spring biased breaker means connected to said first end wall means and extending generally radially toward but spaced from the interior periphery of said one end of said cylindrical container;

said first spring biased breaker means being operable to act in opposing cooperation with said packing vanes mounted upon the peripheral interior surface of said one end of said cylindrical container wherein oversized waste material deposited within said first end charging means will be first raised by said packing vane means and if said waste material is larger than the passage between the radial extent of said spring biased breaker means and said packing vane means said waste material will contact the extremity of said spring biased breaker means and be reduced by said breaker means before entering said container; and second spring biased breaker means connected to said second end wall means and extending generally radially toward but spaced from the interior periphery of said other end of said cylindrical container, said second spring biased breaker means being operable to act in opposing cooperation with said packing vanes mounted upon the peripheral interior surface of said other end of said cylindrical container wherein oversized waste material deposited within said first end charging means will be first raised by said packing vane means and if said waste material is larger than the passage between the radial extent of said spring biased breaker means and said packing vane means said waste material will contact the extremity of said spring biased breaker means and be reduced by said breaker means before entering said container.

3. An apparatus for collecting and compacting waste material comprising:

a hollow cylindrical container operable to be mounted upon a truck chassis for selective rotation about the longitudinal axis of said cylindrical container;

first end wall means operable to be mounted upon the truck chassis and being positioned across one end of said cylindrical container;

second end wall means operable to be mounted upon the truck chassis and being positioned across the other end of said cylindrical container;

means mounted upon said truck chassis and connected to said cylindrical container for selectively rotating said cylindrical container about the central longitudinal axis thereof;

charging means fashioned within each of said first and second end wall means for receiving waste material deposited at either end of said cylindrical container;

packing vane means mounted upon the peripheral interior surface of each end of said cylindrical container for raising waste material deposited within said charging means into said cylindrical container upon rotation of said container about the longitudinal axis thereof;

means connected to said cylindrical container for translating waste material deposited within each end of said cylindrical container toward the longitudinal center of said container wherein waste material may be tightly compacted within said cylindrical container from each end thereof; and first spring biased breaker means connected to said first end wall means and extending generally radially toward but spaced from the interior periphery of said one end of said cylindrical container, said first spring biased breaker means being operable to act in opposing cooperation with said packing vanes mounted upon the peripheral interior surface of said one end of said cylindrical container wherein oversized waste material deposited within said first end charging means will be first raised by said packing vane means and if said waste material is larger than the passage between the radial extent of said spring biased breaker means and said packing vane means said waste material will contact the extremity of said spring biased breaker means and be reduced by said breaker means before entering said container, and second spring biased breaker means connected to said second end wall means and extending generally radially toward but spaced from the interior periphery of said other end of said cylindrical container, said second spring biased breaker means being operable to act in opposing cooperation with said packing vanes mounted upon the peripheral interior surface of said other end of said cylindrical container wherein oversized waste material deposited within said first end charging means will be first raised by said packing vane means and if said waste material is larger than the passage between the radial extent of said spring biased breaker means and said packing vane means said waste material will contact the extremity of said spring biased breaker means and be reduced by said breaker means before entering said container.

4. An apparatus for collecting and compacting waste material as defined in claim 3 wherein said means for translating comprises:

a first plurality of translating vanes mounted upon the interior surface said cylindrical container and extending helically from one end of said container toward the center thereof; and a second plurality of translating vanes mounted upon the interior surface of said cylindrical container and extending helically from the other end of said container toward the center thereof; wherein, upon rotation of said container, waste material deposited within said charging means at either end of said cylindrical container will be translated toward the center of said container by said first and second plurality of helical translating vanes to tightly compact waste material within said cylindrical container.

5. An apparatus for collecting and compacting waste material as defined in claim 3 wherein said extremity of said breaker means and said packing vanes at each end of said container include:

opposing teeth means projecting outwardly from the extremities of said breaker means and inwardly from the extremities of said packing vanes to engage waste material deposited within said charging means and reduce oversized items upon delivery into said cylindrical container.

6. An apparatus for collecting and compacting waste material comprising:

a hollow cylindrical container operable to be mounted upon a truck chassis for selective rotation about the longitudinal axis of said cylindrical container;

first end wall means operable to be mounted upon the truck chassis and being positioned across one end of said cylindrical container; second end wall means;

means mounted upon said truck chassis and connected to said cylindrical container for selectively rotating said cylindrical container about the central longitudinal axis thereof;

charging means fashioned within said first end wall means for receiving waste material deposited therein;

packing vane means mounted upon the peripheral interior surface of said first end wall means of said cylindrical container for raising waste material deposited within said charging means into said cylindrical container upon rotation of said container about the longitudinal axis thereof;

means connected to said cylindrical container for translating waste material deposited within said cylindrical container wherein waste material may be tightly compacted within said cylindrical container;

a plurality of translating vanes mounted upon the interior surface of said cylindrical container and extending helically from one end of said container;

first discoid means rotatively mounted upon said first end wall means of said cylindrical container and being directed generally inwardly and upwardly toward the central portion of said container, said first discoid means having generally radially extending vanes thereon and being mounted adjacent the charging means of said one end wall for contacting waste material delivered into the interior of said container and for directing said waste material toward the other end of said container; and first spring biased breaker means connected to said end wall means and extending generally radially toward but spaced from the interior periphery of said first end wall means of said cylindrical container, said first spring biased breaker means being operable to act in opposing cooperation with said packing vanes mounted upon the peripheral interior surface of said one end of said cylindrical container wherein oversized waste material deposited within said first end charging means will be first raised by said packing vane means and if said waste material is larger than the passage between the radial extent of said spring biased breaker means and said packing vane means said waste material will contact the extremity of said spring biased breaker means and be reduced by said breaker means before entering said container.

* * * * *